UNITED STATES PATENT OFFICE.

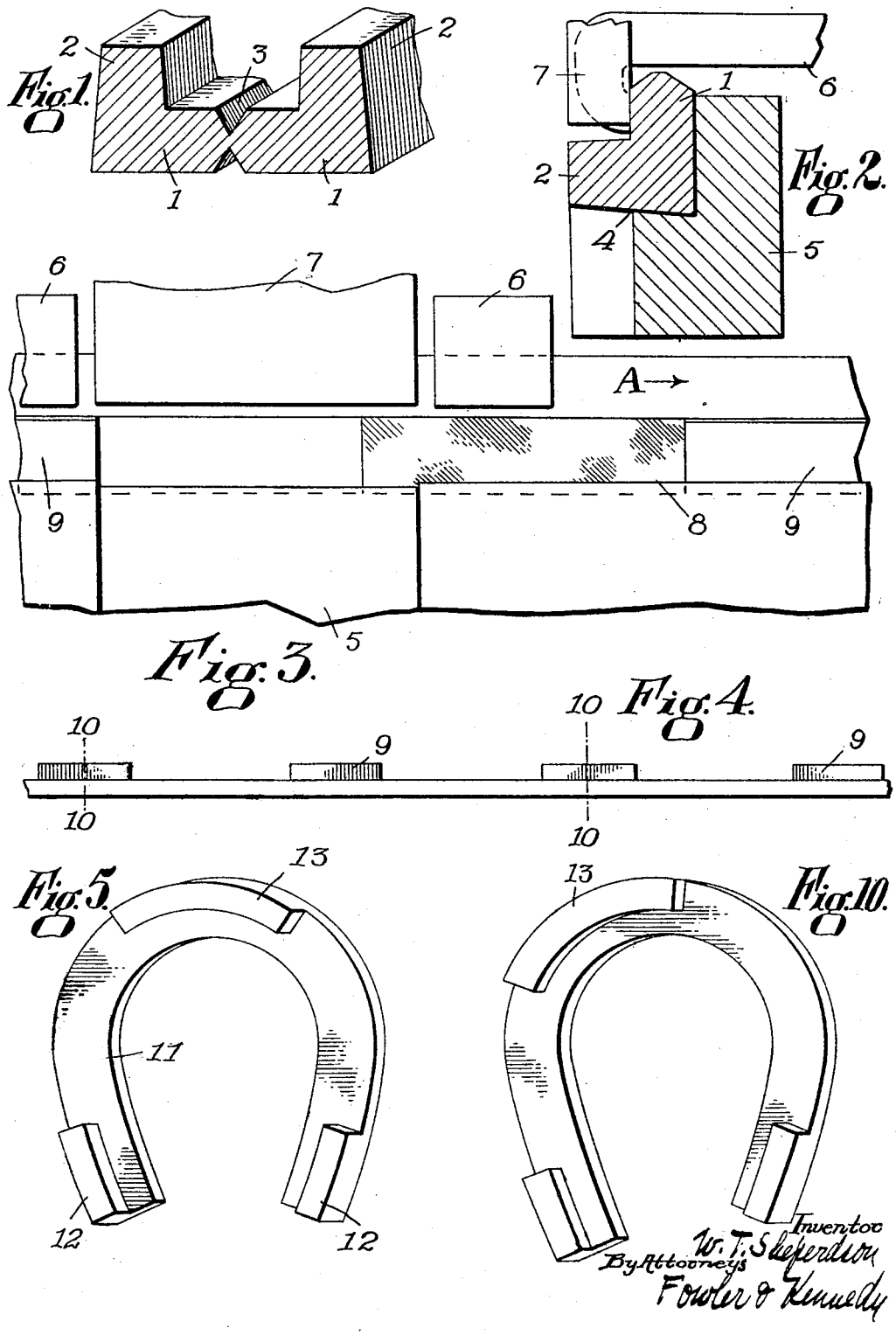

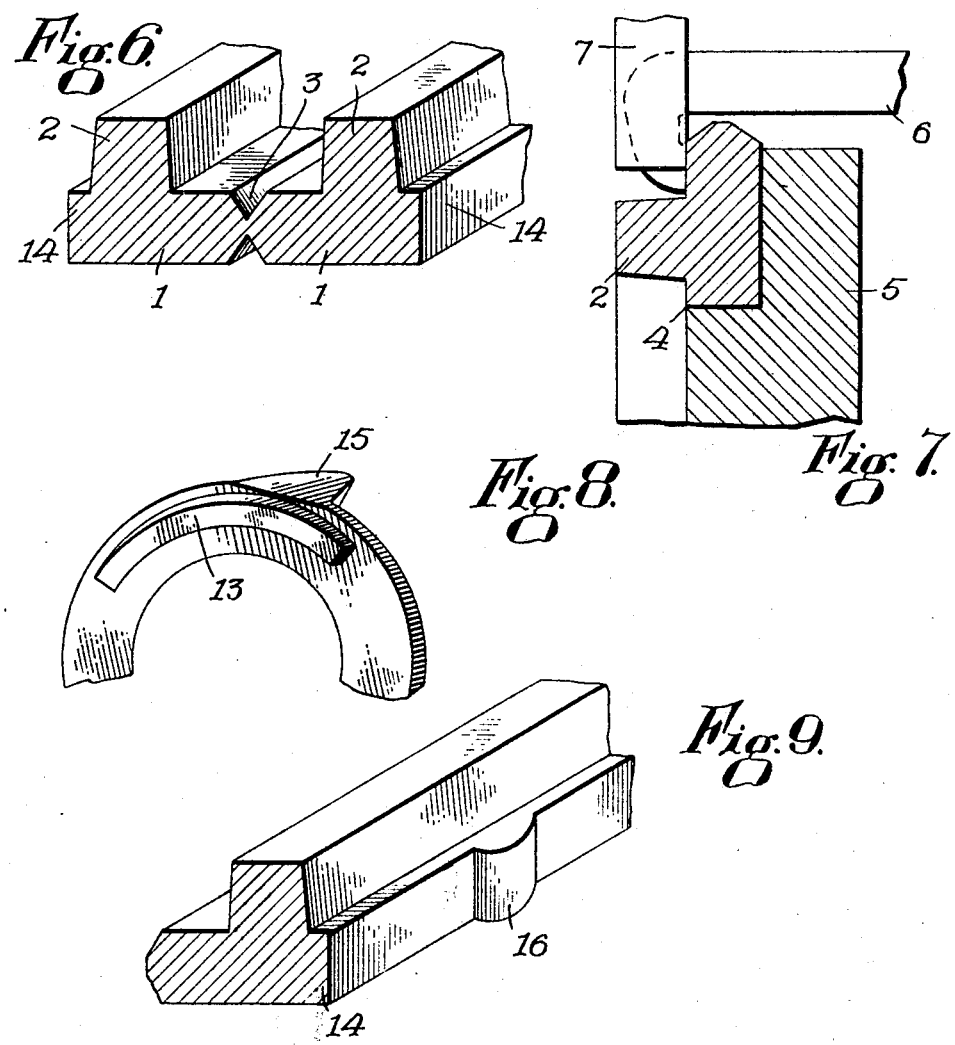

WILLIAM T. SHEPERDSON, OF LARCHMONT, NEW YORK.

METHOD OF MANUFACTURING HORSESHOES.

1,324,748.  Specification of Letters Patent.  Patented Dec. 9, 1919.

Application filed August 12, 1918. Serial No. 249,520.

*To all whom it may concern:*

Be it known that I, WILLIAM T. SHEPERDSON, a subject of the British Empire, residing at Larchmont, in the county of Westchester and State of New York, United States of America, have invented a new and useful Improvement in Methods of Manufacturing Horseshoes, of which the following, together with the accompanying drawings, is a specification.

The present invention relates to the manufacture of horseshoes, and is particularly concerned with the production of horseshoes, by ordinary metal working processes, from a continuous length of rolled stock.

It is the usual practice in making horseshoes, to first form the shoe blanks without the usual toe and heel calk pieces; such pieces are generally welded on by the blacksmith. Some horseshoes are made with permanent toe and heel calks by a drop forging process, and a few others have been made from strip or bar material, resulting from a process of rolling said bar with spaced projections thereon, commonly called a deformed bar; this last method of manufacture has proved extremely unsatisfactory, first, because it is impracticable to thus form toe and heel pieces of sufficient depth, and second, because the rolls used, after being dressed, would be reduced in diameter, and hence the recesses in the passes of said rolls would be changed in depth after each dressing, and would cause a variation in the spacing of the projections on the rolled bar.

The present invention contemplates the production, by hot rolling, of a bar of uniform section, instead of a deformed bar, which bar of uniform section is subsequently operated upon, as hereinafter described, to produce horseshoes with permanent toe and heel calk pieces of any desired arrangement and spacing. Other and further advantages of the invention will be apparent as the description proceeds, reference being had in this connection to the accompanying drawings, wherein—

Figure 1 is a perspective view of a bar of uniform section, as produced by ordinary hot rolling, for manufacture into horseshoes according to my invention.

Figs. 2 and 3 are diagrammatic views illustrating the subjection of the bar to a shearing or punching operation, in the preparation thereof for manufacture into horseshoes.

Fig. 4 is a side view of the bar as it appears after the shearing operation, and illustrating the manner of dividing said bar into proper lengths for manufacture into horseshoes.

Fig. 5 is a plan view of a horseshoe as manufactured from one of the lengths produced in Fig. 4.

Fig. 6 is a view similar to Fig. 1, illustrating a slight modification in the shape of the section.

Fig. 7 is a diagrammatic view illustrating the shearing or punching operations of Figs. 2 and 3 as applied to the modified section of Fig. 6.

Fig. 8 is a perspective view of the modified bar section illustrating the formation of clips thereon.

Fig. 9 is a further modification of the section, involving the production, by rolling, of spaced projections to be formed into clips.

Fig. 10 is a view similar to Fig. 5, showing a horseshoe of slightly modified form.

Like reference characters refer to like parts in the different figures.

As shown in Fig. 1, the initial step of my improved method is the production of a bar of uniform special section, and substantially angular in form, involving a portion 1 which furnishes the flat section of the shoe, and a portion 2 at an angle to the portion 1, which portion 2 furnishes the calks of the shoe. As herein shown, such a section is readily susceptible to hot rolling from suitable material, such as iron or steel, by ordinary rolling mill methods, and preferably such a section is rolled double and opposed, with the two portions 1, 1 thereof continuous, and having a crease 3 between them, to facilitate division of the rolled product into a pair of similar bars. The rolled product, which is illustrated in Fig. 1, is split longitudinally along the crease 3 by any well known means, as for instance a slitting shear of ordinary construction, or if the indentation of the crease is sufficiently deep, the rolled product can be broken in two.

As a result of the operation of rolling and the operation of dividing the rolled product as above described, two continuous bars or lengths of the required section 1, 2 are produced, each adapted for treatment, as hereinafter described, to produce a plurality of horseshoes.

It is proposed to remove certain parts of the portion or flange 2 of the bar, leaving other portions untouched, so as to provide a substantially flat bar, constituted by the portion 1, with spaced projections on one surface thereof, constituted by the remaining portions of the flange 2. These projections are adapted to serve ultimately as the toe and heel pieces of the shoes, when the bar is severed into proper lengths before bending. The removal of portions of the flange 2 may be effected in any well known manner, and for purposes of illustration, I have illustrated diagrammatically, in Figs. 2 and 3, the employment of a punching or shearing operation to effect this removal, the bar being disposed with its flange 2 overhanging the cutting edge 4 of a stationary shear or punch member 5, which is suitably recessed to accommodate the flat portion 1 of the bar. Any suitable clamping means, such as shown at 6, may be employed to steady the bar and prevent its tipping when the movable member 7 of the shearing or punching mechanism descends, it being clear that such movement is calculated to remove a portion of the flange 2 of a length equal to the width of said movable member 7.

For the purposes of the present invention, the projections left remaining above the portion 1 by this shearing or punching operation may, if desired, be of equal lengths and equally spaced one from the other, as illustrated in Fig. 4. Under these conditions, the removal of the intermediate portions of flange 2 may be effected by the use of shearing or punching mechanism whose width need only be a little more than half the length of the portion which is to be removed. As shown in Fig. 3, the bar, after the removal of the flange portion illustrated by the shaded area 8, may be moved along through the shear or punch in the direction of arrow A, and then brought to a stop in the proper position to have the next operation of the shear or punch remove the remainder of the flange 2, to provide a gap of the desired length. Thereafter, the bar is again fed forward in the direction of arrow A to carry a portion of flange 2, corresponding in length to one of the projections 9, entirely through and beyond the punch or shear, whereupon the punching or shearing operation is resumed, to remove the material in front of the next projection 9.

As shown in Fig. 4, the bar with its equally spaced projections 9 is then in readiness to be cut up into suitable lengths, each length adapted to be bent into the form of a shoe. The shearing or severing is preferably effected at the center of each alternate projection 9, as indicated by the lines 10, 10 on Fig. 4, so that each length thus cut off has a short projection at each end and a projection of double length at the center. Thereafter, each length is bent into the form of a horseshoe 11, as shown in Fig. 5, the latter having heel calk pieces 12, 12 of relatively short length at each end, and a toe calk piece 13, twice the length of the heel pieces at its center. It will be obvious, however, that the spacing of the heel and toe pieces in the completed shoes need not, unless desired, be uniform and symmetrical, as above described. By simply varying the feed of the bar through the shearing or punching mechanism, it is possible to obtain in the completed shoe a toe piece 13 which is off center; this can be done by removing from the bar alternately greater and smaller portions of the flange 2, so that when the bar is severed in accordance with the method illustrated in Fig. 4, the toe piece 13 will be nearer one heel piece 12 and farther from the other heel piece 12, as illustrated in Fig. 10. This is of particular advantage in the manufacture of horseshoes to be applied to the hind feet of horses that wear their shoes more on one side than the other, and the present method of manufacture obviously lends itself to any desired arrangement of heel and toe pieces that may be required. In Fig. 6 I have illustrated a section of rolled product similar to that shown in Fig. 1, but so formed as to enable the shoes made therefrom to be attached more readily to the hoof. To this end the portions 1, 1 are rolled with narrow external shoulders 14, 14, the material of which is adapted to be drawn or upset at desired points in the completed shoe to provide clips 15, as illustrated in Fig. 8. The removal of portions of the flange 2 from a bar of this section is accomplished in the same manner as previously described, the necessary changes in the form of the shear or punching mechanism to accommodate such a bar being illustrated in Fig. 7. Or, if desired, as illustrated in Fig. 9, the shoulders 14 of such a bar may be rolled with spaced lugs 16, thereby affording more material for the production of the clips and therefore insuring larger and more substantial clips than the one shown in Fig. 8.

Horseshoes made as above described, as shown in Fig. 5 or Fig. 10, are readily adaptable to the formation of clips thereon by any of the above described methods, involving simply slight variations in the rolled section to provide material for the clips. It is to be understood that my invention is in no sense confined to the precise forms and proportions herein shown, the drawings being merely illustrative of the principles of the invention, as set forth in the annexed claims, and being susceptible of wide variation, without departing from the spirit of the invention. It is also to be understood that the carrying out of the invention is not in any way limited or confined to the precise order or sequence of steps herein enumerated, it being clear that variations therefrom are possible, as for instance by dividing the rolled material into horseshoe lengths before the removal of the spaced flange portions.

Horseshoes made as above described are completed, the same as horseshoes as at present made, by the addition of the usual drop forged creases, providing nail holes for securing the shoe to the horse's hoof; this step in the manufacture of the shoe forms no part of the present invention and hence need not be illustrated or described in detail.

I claim,

1. The herein described method of manufacturing horseshoes with integral calk pieces, which consists in rolling a length of stock with a longitudinal flange, removing portions of said flange to leave said stock with a plurality of spaced projections, and dividing said stock into horseshoe lengths, with said spaced projections forming heel and toe calk pieces on each length.

2. The herein described method of manufacturing horseshoes with integral calk pieces which consists in removing spaced portions of the flange of a continuous bar, to leave a plurality of spaced projections thereon in the form of horseshoe calks, dividing said bar into horseshoe lengths by cuts taken transversely through alternate projections whereby the severed projections constitute heel calks and the unsevered projections constitute toe calks, and bending each length into horseshoe form.

3. The herein described method of manufacturing horseshoes, which consists in rolling a length of stock of approximately channel formation, splitting said stock longitudinally to provide bars with longitudinal flanges, removing portions of said flanges to leave spaced projections constituting heel and toe calk pieces, dividing said bars into suitable horseshoe lengths and bending said lengths into horseshoe form.

4. The herein described method of manufacturing horseshoes which consists in rolling a bar with a continuous flange and with a continuous shoulder, removing spaced portions of said flange, to leave a plurality of spaced projections thereon, dividing said bar by cuts taken transversely through alternate projections, bending each division into horseshoe form, and drawing the material of said shoulder at intervals to form clips.

5. The herein described method of manufacturing horseshoes which consists in rolling a bar with a continuous flange and with a plurality of spaced lugs, removing spaced portions of said flange to provide spaced projections to constitute, when the bar is divided, the heel and toe pieces of the shoes, and drawing the material of said lugs to form clips on said shoes.

6. The herein described method of manufacturing horseshoes with integral calk pieces which consists in rolling a bar with a continuous flange, dividing said bar into lengths suitable for bending into horseshoe form, and removing portions of said flange to leave three projections on each length, one at each end thereof constituting heel calks, and one intermediate the ends thereof constituting a toe calk.

WILLIAM T. SHEPERDSON.

In the presence of—
ANNA M. JOHNSON,
JAMES S. DOWLING.